July 28, 1964  R. W. GOTCH  3,142,745
ROTATABLE ARC WELDING TORCH
Filed May 4, 1962  2 Sheets-Sheet 1

INVENTOR
RONALD W. GOTCH
BY Richard H. Thomas
ATTORNEY

July 28, 1964       R. W. GOTCH       3,142,745
ROTATABLE ARC WELDING TORCH

Filed May 4, 1962                    2 Sheets-Sheet 2

INVENTOR
RONALD W. GOTCH

BY Richard H. Thomas
ATTORNEY

United States Patent Office 3,142,745
Patented July 28, 1964

3,142,745
ROTATABLE ARC WELDING TORCH
Ronald William Gotch, Ashford, England, assignor to Foster Wheeler Corporation, New York, N.Y., a corporation of New York
Filed May 4, 1962, Ser. No. 192,516
Claims priority, application Great Britain May 19, 1961
5 Claims. (Cl. 219—125)

This invention relates to an electrode arc welding torch and more particularly to electrode arc welding equipment for internally welding tubular members together.

For the purpose of butt welding closely-pitched tubes to tube plates in the fabrication of heat exchangers, a welding torch arrangement was developed which enabled the welds to be effected from inside the tubes. This internal welding torch is shown, described and claimed in co-pending patent application Serial No. 10,956, filed February 25, 1960, now Patent No. 3,084,243, granted April 2, 1963. The present invention is concerned with improvements in the torch.

The internal tube welding torch described in the co-pending application comprises, principally, a torch housing and a welding electrode supported for rotation relative to the housing. An electrode holder is provided retained within a highly insulating guard tube or shield, the welding electrode being held by and extending laterally from the holder through an opening or slot within the guard tube. The housing is adapted to be supported coextensive with the tubular members to be welded and the electrode, electrode holder and guard tube extend axially from the housing into one of the tubular members to be welded such that the electrode tip is positioned adjacent the point of weld.

During the welding the electrode holder, shield and electrode are rotated so that the electrode tip scribes a circular path concentric to the end of the tubular member to be welded. In this latter respect, it is important that the electrode be rotated accurately round the axis of the tube. In the co-pending application, this is achieved by surrounding the guard tube with a sleeve or mandrel which fits the bore of the tube to be welded and accurately centers or locates the electrode holder.

In accordance with the present invention, the centering sleeve is replaced by a plate forming part of the housing or body of the torch, from which there is provided, in a novel manner, a pair of pegs projecting along axes parallel to the axis of the electrode holder. The pegs are adapted to be engaged in pairs of holes in the tube plate, and thus to register the axis of the electrode holder with that of the hole in which the latter is disposed.

In a preferred form of the invention, the pegs are affixed to the plate, or other supporting member, in a way to permit a limited amount of adjustment and to adapt the arrangement to the pitching of the holes in the tube plate. Also, for the purpose of engaging the pegs with the holes in which they are inserted the pegs are expansible into gripping engagement with the holes.

The invention and advantages thereof will become more apparent on consideration of the following detailed description and the accompanying drawings, in which.

Figure 1:
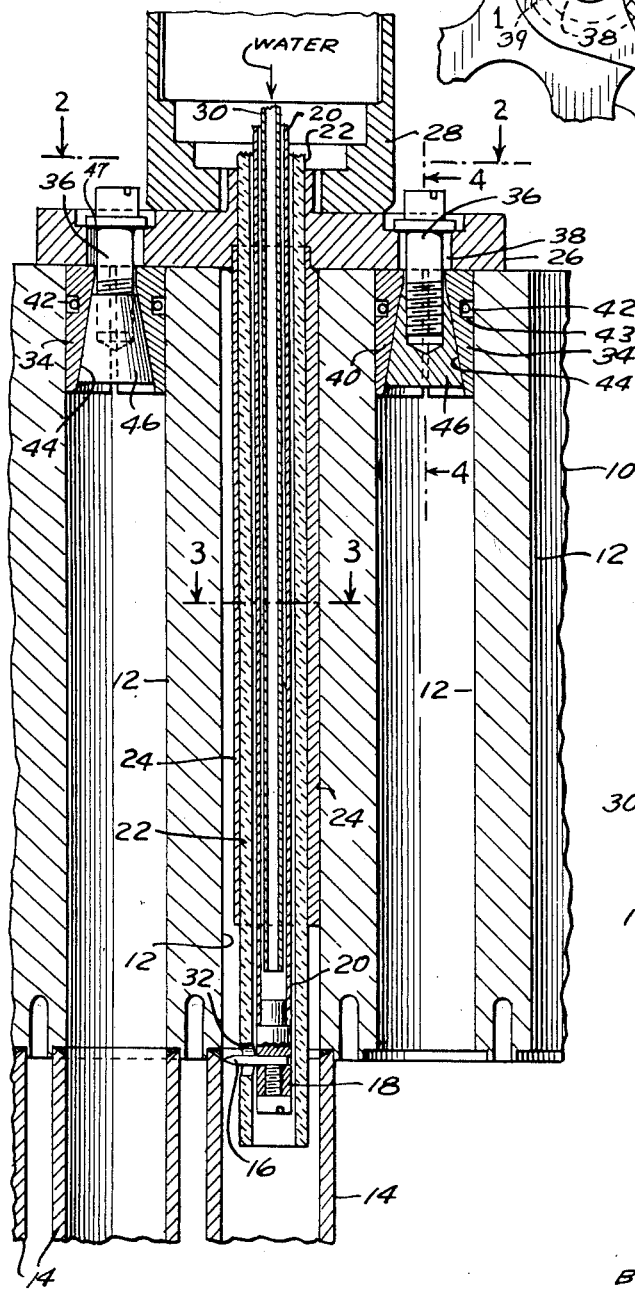
FIGURE 1 is a sectional elevation view of an electric arc welding torch in accordance with the invention.

Referring to FIG. 1, there is illustrated a portion of a tube sheet 10 having closely pitched holes 12, to the inner ends of which tubes 14 are to be butt welded. For this purpose the welding torch of the invention is used, which for the sake of clarity, is shown only in part. This includes an electrode 16 carried by a plug 18 positioned in the end of an electrode holder or tube 20 of good thermal and electrical conductivity. The holder or tube 20 is mounted with clearance but coaxially in a tube or shield 22 of a good insulating material, such as ceramic, the tube 22 itself being mounted or encased in a brass guard tube 24. The guard tube is fixed at one end to a centering plate 26 which in turn is fixed to the body 28 of the torch. In use the torch is inserted into one of the holes 12 of the tube sheet so that the electrode 16 is at the level or adjacent to the point at which the weld is to be made. An inert gas such as argon is supplied through the clearance space between the electrode holder 20 and the shield 22 and cooling water is supplied through an inner tube 30 coaxial with but inside of the electrode holder tube to the vicinity of the plug 18, the water flowing out through the clearance space between the inner tube 30 and the holder 20. The shield 22 and holder 20 are rotated about their longitudinal axis within the brass guard tube 24 so that the electrode 16 which projects through a hole 32 in the shield 22 moves in a circular path opposite the junction between the tube plate and the tube 14 to be welded to it.

Figure 4:
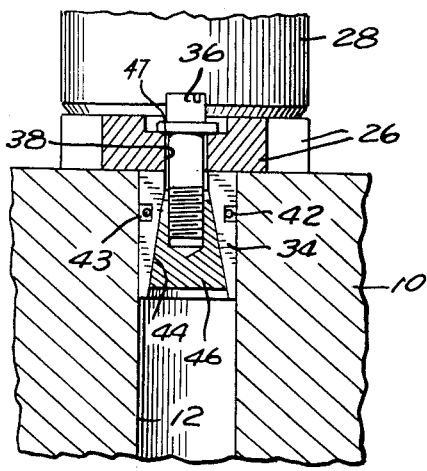
FIGURE 4 is an enlarged fragmentary section view taken along line 4—4 of FIG. 1.

It is essential that the tip of the electrode be always at the same distance from the point at which the weld is effected, for which purpose, the axis of the assembly of the tubular members constituting the torch must be accurately aligned with the axis of the hole in the tube sheet. To ensure this, the centering plate 26 is provided with two pegs 34, FIGS. 1 and 4, which are adapted to be engaged in holes 12 adjacent to the hole in which the welding torch is located. Shanks 36 are provided extending through holes 38 in the centering plate for holding the pegs to the plate. To provide a limited degree or freedom of movement for the pegs so that they can be adjusted for a particular tube sheet pitch of holes 12, the plate holes 38 are slotted providing a clearance at 39, FIG. 2, for increasing or decreasing the distance between pegs.

Figure 5:
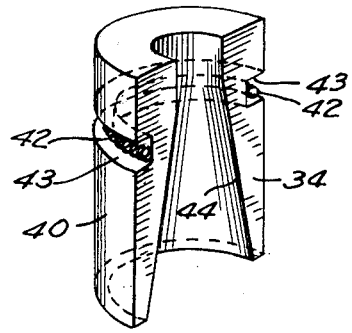
FIGURE 5 is an enlarged perspective view of a peg element in accordance with the invention.

In order that the torch may be fixed in the adjusted position, the pegs 34 are made up of separable parts 40, FIG. 5, held together by a spring clip 42 contained in a peripheral slot 43. These two parts define a conical cavity 44 in which is housed a locking plug 46 having a complementary conical shape. The shank 36 of each peg is screw threaded at its lower end into the locking plug 46 and the shanks are provided with shoulder portions 47 supported against the upper surface of the centering plate. By turning the shanks, the pegs are expanded into the holes in which they are inserted and are pressed against the tube sheet thereby clamping the whole device in the adjusted position.

Figure 2:
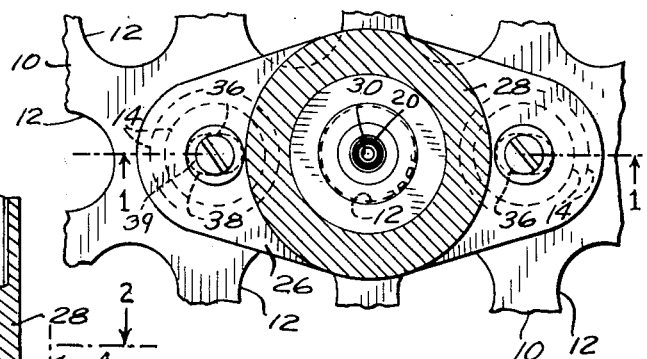
FIGURE 2 is a plan section view of the torch taken along line 2—2 of FIG. 1.

The pegs can be arranged so as to be engaged in holes 12 on either side of the one in which the weld is being effected, as shown in FIG. 2 or the arrangement may be adapted so that they can be inserted in any two holes in the tube plate.

Figure 6:
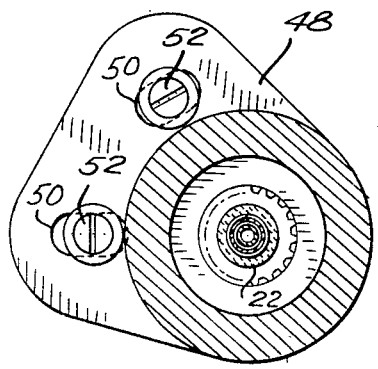
FIGURE 6 illustrates an embodiment of the invention.

FIG. 6 shows a modified arrangement in which the two registering holes are on the same side of the hole at which the welding is being effected. As illustrated the centering plate 48 is shaped so that the slots 50 retaining the peg shanks 52, as well as the welding unit, are eccentrically located or off-center on the plate.

Figure 3:
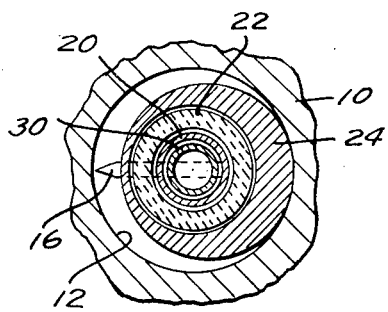
FIGURE 3 is an enlarged fragmentary section view of the torch taken along line 3—3 of FIG. 1.

In order that the torch may be properly aligned in the hole in which it is inserted it must be free for lateral movement therein. This can be provided for by the use of a guard tube 24 of smaller diameter than the hole. It is preferred, however, to use a guard tube which, as shown in FIG. 3, is eccentric to the axis of the other tubes, the degree of eccentricity being sufficient such that the larger radius of the tube or shield equals one half the inside diameter of the tube sheet hole 12 and the lesser radius provides a substantial clearance on the opposite side. The desired alignment can then be effected by bringing the thick part of the guard tube into contact with the wall of the hole 12, the parts then being locked in position by means of the pegs 34. Insertion and removal of the torch from the hole is simplified by the generous clearance on the lesser radius side provided between the guard tube and the wall of the tube sheet hole.

Although the invention has been described with reference to a specific embodiment, many variations within the scope and spirit of the invention, as defined by the following claims, will be apparent to those skilled in the art.

What is claimed is:

1. A rotatable arc welding torch for welding tubes to a tube sheet comprising an elongated rod-like electrode holder, an electrode supported by said holder and extending laterally therefrom, housing means adapted to support said holder within a tube sheet hole and to locate said electrode adjacent the point of the weld, a centering plate affixed to said housing, peg means projecting from said centering plate along axes parallel to the axis of said electrode holder adapted to be engaged in spaced holes in the tube sheet other than the hole in which said electrode holder is supported, and tubular guard means encompassing said electrode holder having an eccentric cross sectional configuration adapted to tangentially contact the wall of the tube sheet hole and to locate the electrode holder so that its axis of rotation coincides with the axis of the tube sheet hole in which it is supported, said peg means being adapted for lateral movement relative to said axis of rotation.

2. A rotatable arc welding torch according to claim 1 wherein said tubular guard means has a major outside radius equal to the radius of the tube sheet hole and an oppositely directed lesser radius providing a substantial clearance with the wall of the tube sheet hole.

3. A rotatable arc welding torch according to claim 2 wherein said peg means are adapted for lateral movement relative to the welding torch housing.

4. A rotatable arc welding torch for welding tubes to a tube sheet comprising
an elongated rod-like electrode holder having a longitudinal axis,
an electrode supported by said holder and extending laterally therefrom,
housing means adapted to support said holder within a hole of the tube sheet and to locate said electrode adjacent the point of the tube to tube sheet weld,
a centering plate affixed to said housing,
peg means projecting from said centering plate along axes parallel to the axis of said electrode holder adapted to be engaged in spaced openings in the tube sheet other than the hole in which said electrode is supported,
locating means supported by the holder along one side of the holder of predetermined dimension adapted to locate the holder within the tube sheet hole so that the axis of rotation of the holder coincides with the axis of the tube sheet hole, the locating means and holder arranged to be of lesser diameter than the tube sheet hole to permit lateral movement therein.

5. A torch according to claim 4 wherein said peg means are adapted for lateral movement relative to the holder axis of rotation.

References Cited in the file of this patent
UNITED STATES PATENTS

| | | |
|---|---|---|
| 1,508,713 | Noble | Sept. 16, 1924 |
| 2,818,493 | Pilia et al. | Dec. 31, 1957 |
| 2,868,953 | Gardner | Jan. 13, 1959 |
| 3,064,120 | Ache | Nov. 13, 1962 |